US008254612B2

(12) United States Patent
Chen

(10) Patent No.: US 8,254,612 B2
(45) Date of Patent: Aug. 28, 2012

(54) SOUND SYSTEM FOR PORTABLE ELECTRONIC DEVICE

(75) Inventor: Meng-Chun Chen, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 1277 days.

(21) Appl. No.: 11/967,064

(22) Filed: Dec. 29, 2007

(65) Prior Publication Data

US 2009/0161881 A1 Jun. 25, 2009

(30) Foreign Application Priority Data

Dec. 21, 2007 (CN) .......................... 2007 1 0203337

(51) Int. Cl.

*H04R 9/06* (2006.01)
*H04R 5/00* (2006.01)
*H04R 1/02* (2006.01)
*H04R 5/02* (2006.01)
*G06F 17/00* (2006.01)

(52) U.S. Cl. .............. 381/334; 381/1; 381/87; 381/300; 381/304; 381/307; 700/94

(58) Field of Classification Search .................. 381/1, 2, 381/27, 87, 300, 303–309, 332–334, 386, 381/388; 700/94

See application file for complete search history.

(56) References Cited

U.S. PATENT DOCUMENTS 7,006,645 B2 * 2/2006 Fujita et al. ................... 381/307
2002/0146139 A1 * 10/2002 Oplinger ....................... 381/300
2002/0186854 A1 * 12/2002 Hosoi et al. ..................... 381/99
2004/0120537 A1 * 6/2004 Takei ............................ 381/307
2006/0062396 A1 * 3/2006 Jin .................................. 381/19
2007/0077020 A1 * 4/2007 Takahama ......................... 386/1

FOREIGN PATENT DOCUMENTS

CN 1276959 A 12/2000
CN 1672114 A 9/2005
WO WO 2007007083 A1 * 1/2007

* cited by examiner

*Primary Examiner* — Mohamad Musleh
*Assistant Examiner* — Tsz Chan
(74) *Attorney, Agent, or Firm* — Altis Law Group, Inc.

(57) ABSTRACT

A sound system (30) for a portable electronic device (20) is provided. The sound system includes a sound generator (28), a sound processor (25), and a speaker subsystem (24). The sound generator is configured for generating sound recordings with single sound format. The sound processor electronically connects with the sound generator and is configured for receiving the sound recordings with single sound format transmitted from the sound processor. The sound processor is configured for processing the sound recordings with single sound format into sound recordings with 5.1 surround format. The speaker subsystem electronically connects with the sound processor and is configured for receiving the sound recordings with 5.1 surround format transmitted from the sound processor and playing the sound recordings with 5.1 surround format.

1 Claim, 4 Drawing Sheets

SOUND SYSTEM FOR PORTABLE ELECTRONIC DEVICE

BACKGROUND OF THE INVENTION

1. Field of the Invention

The present invention relates to sound systems, particularly to a sound system for a portable electronic device.

2. Description of Related Art

Usually, a portable electronic device (e.g., a mobile phone) incorporates a two-channel sound system with a single sound format therewith. The stereo effect of two-channel sound system is relatively weak, thus cannot achieve HiFi level of performance of the portable electronic device. For example, the two-channel sound system cannot properly play multi-channel sound recordings, e.g., 5.1 surround sound recordings.

Therefore, a heretofore-unaddressed need exists in the art to address the aforementioned deficiencies and inadequacies.

SUMMARY

In present aspect, a sound system for a portable electronic device is provided. The sound system includes a sound generator, a sound processor, and a speaker subsystem. The sound generator is configured for generating sound recordings with a single sound format. The sound processor electronically connects with the sound generator and is configured for receiving the sound recordings with a single sound format transmitted from the sound processor. The sound processor is configured for processing the sound recordings with a single sound format into sound recordings with 5.1 surround format. The speaker subsystem electronically connects with the sound processor and is configured for receiving the sound recordings with 5.1 surround format transmitted from the sound processor and playing the sound recordings with 5.1 surround format.

In another aspect, a portable electronic device using the present sound system is provided.

These and other aspects of the present invention will become more apparent from the following detailed description of the preferred embodiments taken in conjunction with the accompanying drawings, although variations and modifications therein may be affected without departing from the spirit and scope of the novel concepts of the disclosure.

BRIEF DESCRIPTION OF THE DRAWINGS

Many aspects of the present sound system for the present portable electronic device can be better understood with reference to the following drawings. These drawings are not necessarily drawn to scale, the emphasis instead being placed upon clearly illustrating the principles of the present sound system for the present portable electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EMBODIMENTS

The present sound system for the present portable electronic device (e.g., the mobile phone or the personal digital handset) is described here in conjunction with the accompanying drawings in FIGS. 1 through 4.

Figure 1:
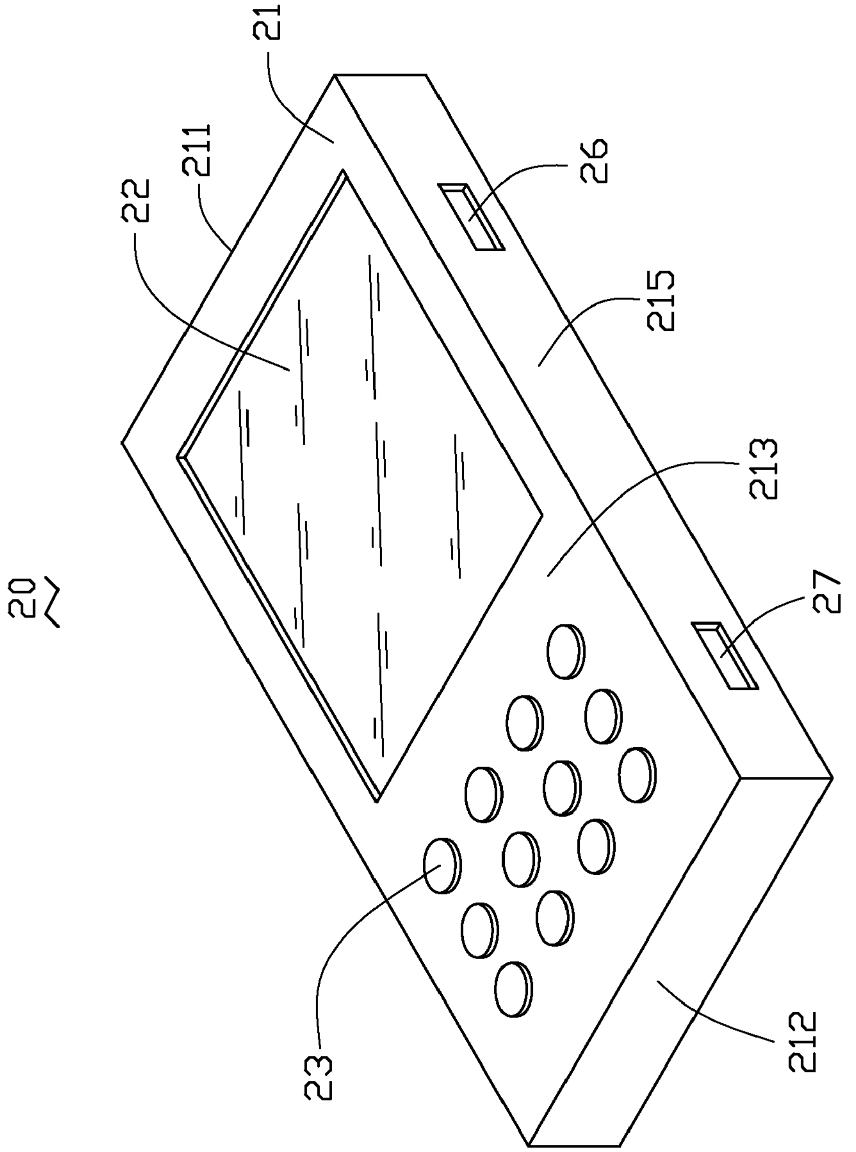
FIG. 1 is an isometric view of a portable electronic device in accordance with a present embodiment.
Figure 2:
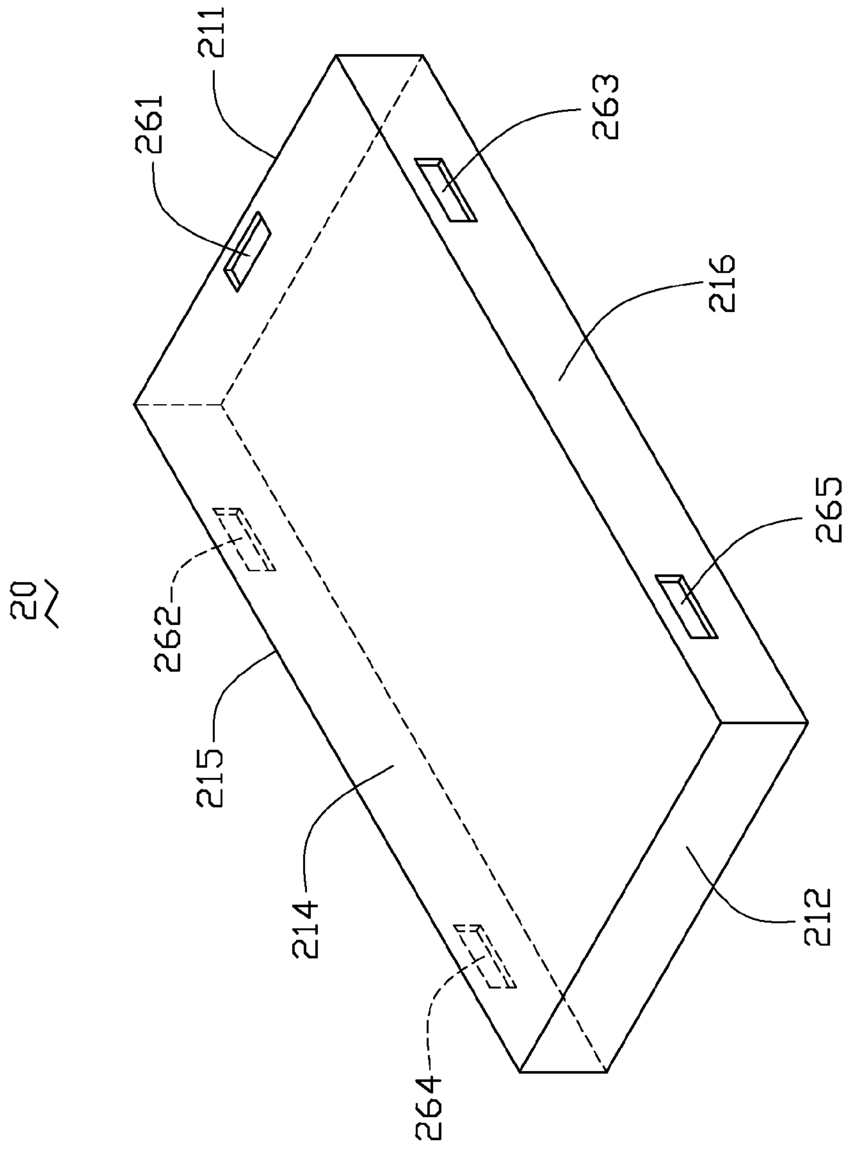
FIG. 2 is another isometric view of the portable electronic device shown in FIG. 1, showing another aspect thereof.
Figure 3:
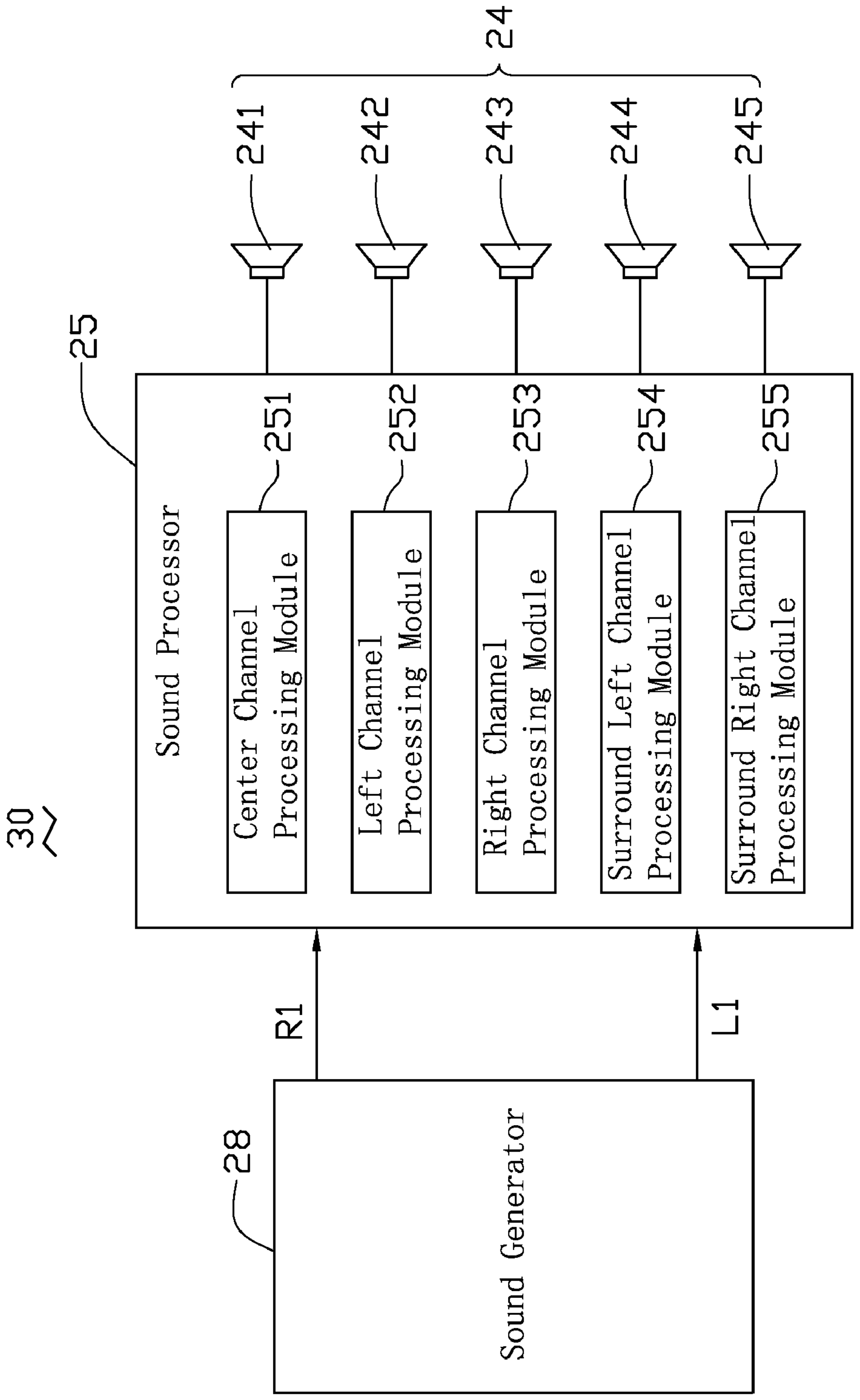
FIG. 3 is a block diagram of a sound system used for the portable electronic device shown in FIG. 1.
Figure 4:
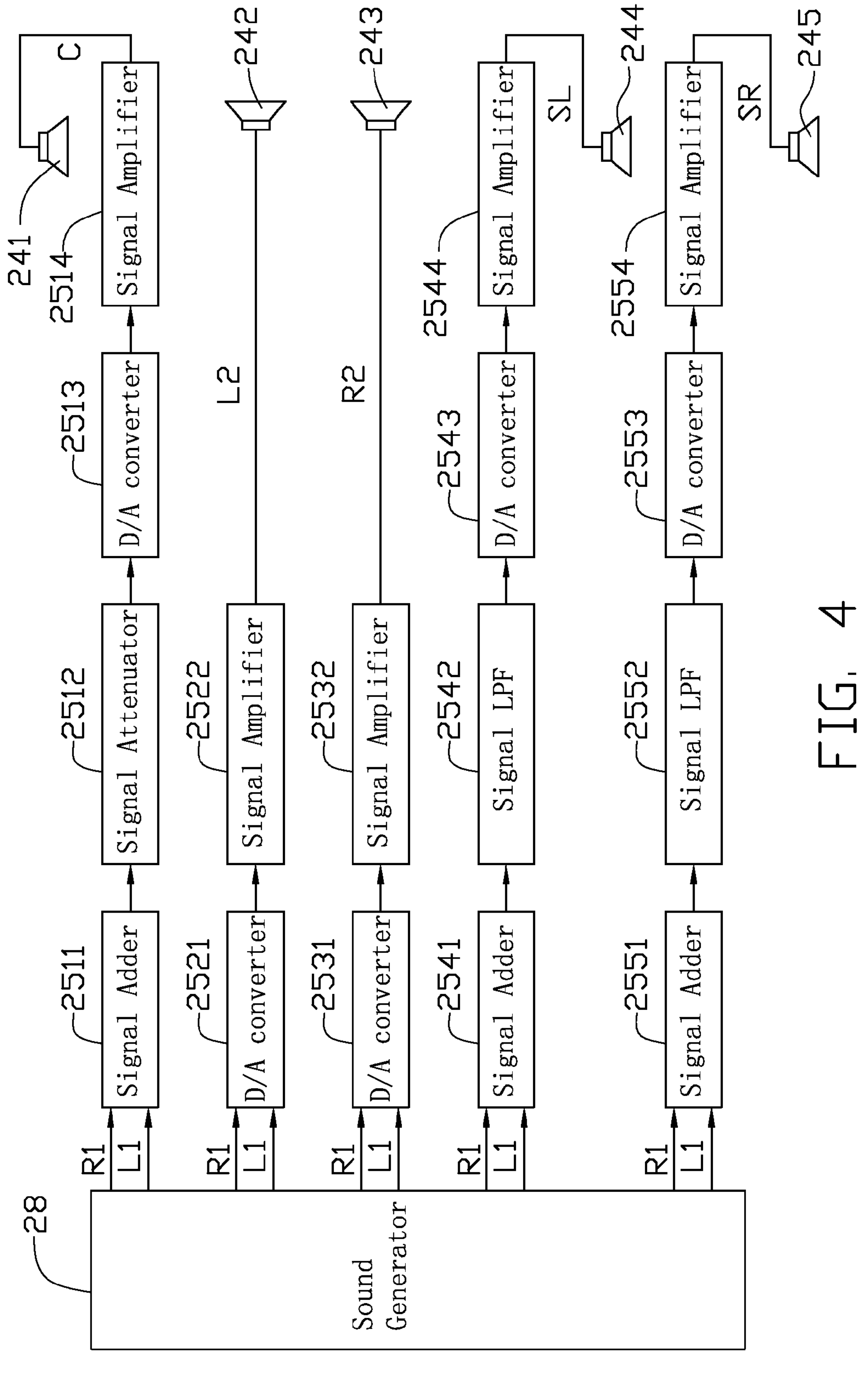
FIG. 4 is another block diagram of the sound system shown in FIG. 3, showing details thereof.

Referring to FIGS. 1 through 3, the mobile phone 20 is exemplified, which includes a housing 21, a display module 22, a keypad assembly 23, and the sound system 30. The display module 22, the keypad assembly 23, the sound system 30 are assembled within the housing 21.

The housing 21 is advantageously generally rectangular-shaped, which includes an upper sidewall 211, a lower sidewall 212 opposite to the upper sidewall 211, an top wall 213, a bottom wall 214 opposite to the top wall 213, a right sidewall 215, and a left sidewall 216 opposite to the right sidewall 215. The upper sidewall 211, the lower sidewall 212, the top wall 213, the bottom wall 214, the left sidewall 216, and the right sidewall 215 interconnect with each other, and cooperatively define a receiving space (not labeled) in the housing 21. The receiving space allows the sound system 30, display module 22, and the keypad assembly 23 to be received therein.

The top wall 213 defines an opening (not labeled) configured (i.e., structured/arranged) in such a manner that the display module 22 is accommodated in the receiving space and exposed from the opening. Also, the top wall 213 has a plurality of holes (not labeled) defined therethrough and are such configured that the keypad assembly 23, as received in the receiving space, is exposed from the plurality of holes.

The bottom wall 214 defines a center enclosure 261 therethrough proximate with the upper sidewall 211. The left sidewall 216 has a left enclosure 263 and a surround left enclosure 265 defined therethrough. The left enclosure 263 is located adjacent to the upper sidewall 211, and the surround left enclosure 265 is located adjacent to the lower sidewall 212. The right sidewall 215 defines a right enclosure 262 and a surround right enclosure 264 therethrough. The right enclosure 262 is positioned opposite to the left enclosure 263, and the surround right enclosure 264 is positioned opposite to the surround left enclosure 265.

The sound system 30 is configured to transform sound recording format, i.e., from single sound format into 5.1 surround format, and then to play the sound recording with the transformed format. The single sound format includes a compressed data stream containing two channels, generally designated left and right, named for the speaker positions for which the channel is intended. By contrast, the 5.1 surround format includes a compressed data stream containing five channels. The five channels are generally designated center, left, right, surround left, and surround right channel, which are named for the intended speaker positions corresponding with the respective channel.

Correspondingly, the sound system 30 includes a speaker subsystem 24, a sound processor 25, and a sound generator 28. The sound generator 28, the sound processor 25, and the speaker subsystem 24 electronically connect with each other, in the order written. The speaker subsystem 24 includes a center speaker 241, a left speaker 242, a right speaker 243, a surround left speaker 244, and a surround right speaker 245. The center speaker 241, the left speaker 242, the right speaker 243, the surround left speaker 244, and the surround right speaker 245 are configured to be mounted in the center enclosure 261, the left enclosure 263, the right enclosure 262, the surround left enclosure 265, and the surround right enclosure 264, respectively.

The sound generator 28 is configured for generating sound recording with a single sound format, and then transmitting the sound recording into the sound processor 25. That is, the first left channel signal and the first right channel signal, designated as L1 signal and R1 signal for sake of description, are transmitted from the sound generator 28 into the sound processor 25.

The sound processor 25 is configured to receive the L1 and R1 signal and then transform the L1 and R1 signal into 5.1 surround format signal. The 5.1 surround format signal contains a center, a left, a right, a surround left, and a surround right channel. The center, the second left, the second right, the surround left, and the surround right channel are respectively designated as C signal, L2 signal, R2 signal, SL signal, SR signal for sake of description. Accordingly, the sound processor 25 includes a center channel processing module 251, a left channel processing module 252, a right channel processing module 253, a surround left channel processing module 254, and a surround right channel processing module 255.

The center channel processing module 251 includes a signal adder 2511, a signal attenuator 2512, a D/A converter 2513 (i.e., digital-to-analog converter), an signal amplifier 2514. The L1 and R1 signal from the sound generator 28 are added by the signal adder 2511 as a mixed signal, i.e., L1+R1 signal. Then, the L1+R1 signal is attenuated by the signal attenuator 2512 in 3 dB (i.e., decibel) and converted into analog signal by the D/A converter 2513. The converted L1+R1 signal is amplified by the amplifier 2514, thereby achieving the C signal. The C signal is then transmitted to the center speaker 241 for playing.

The left channel processing module 252 includes a D/A converter 2521 and a signal amplifier 2522. The L1 signal from the sound generator 28 are converted to analog signal by the D/A converter 2521. The converted L1 signal is amplified by the amplifier 2522, thereby achieving the L2 signal. The L2 signal is the transmitted to the left speaker 242 for playing.

The right channel processing module 253 includes a D/A converter 2531 and an signal amplifier 2532. The R1 signal from the sound generator 28 is converted to analog signal by the D/A converter 2531. The converted R1 signal is amplified by the amplifier 2532, thereby achieving the R2 signal. The R2 signal is then transmitted to the right speaker 243 for playing.

The surround left channel processing module 254 includes an signal adder 2541, a signal LPF 2542 (i.e., signal Low-pass Filter), a D/A converter 2543 and a signal amplifier 2544. The L1 and R1 signal from the sound generator 28 are added by the signal adder 2541 as L1+R1 signal. Signal in a predetermined high frequency range, is filtered from the L1+R1 signal by the signal LPF 2542. The filtered L1+R1 signal is converted to analog signal by the D/A converter 2543. The converted L1+R1 signal is amplified by the amplifier 2544, thereby achieving the SL signal. The SL signal is then transmitted to the surround left speaker 244 for playing.

The surround right channel processing module 255 includes an signal adder 2551, a signal LPF 2552, a D/A converter 2553 and a signal amplifier 2554. The L1 and R1 signal from the sound generator 28 are added by the signal adder 2551 as L1+R1 signal. Signal in a predetermined high frequency range, is filtered from the L1+R1 signal by the signal LPF 2552. The filtered L1+R1 signal is converted to analog signal by the D/A converter 2553. The converted L1+R1 signal is amplified by the amplifier 2554, thereby achieving the SR signal. The SR signal is then transmitted to the surround left speaker 244 for playing.

The center speaker 241, the left speaker 242, the right speaker 243, the surround left speaker 244, and the surround right speaker 245 are configured for respectively receiving and playing the C, L2, R2, LS, and RS signal. Thus, the 5.1 stereo sound effect of the sound system 30 may be achieved.

One main advantage of the present embodiment embodies that the present sound system 30 can play 5.1 surround sound recordings with a relatively strong stereo sound effect via working of the sound generator 28, the sound processor 25, and the speaker subsystem thereof. Thus, HiFi level of performance of the portable electronic device is correspondingly achieved.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A sound system for a portable electronic device, the portable electronic device including a housing, the sound system being disposed within the housing, the sound system comprising:

a sound generator configured for generating sound recordings with single sound format;

a sound processor electronically connecting with the sound generator and configured for receiving the sound recordings with single sound format transmitted from the sound processor, and configured for processing the sound recordings with single sound format into sound recordings with 5.1 surround format;

a speaker subsystem electronically connecting with the sound processor and configured for receiving the sound recordings with 5.1 surround format transmitted from the sound processor and playing the sound recordings with 5.1 surround format;

wherein the sound recordings with single sound format contains a first left channel signal and a first right channel signal, the sound recordings with 5.1 surround format contains a center channel signal, a second left channel signal, a second right channel signal, a surround left channel signal, and a surround right channel signal;

wherein the sound processor comprises a center channel processing module, a left channel processing module, a right channel processing module, a surround left channel processing module, and a surround right channel processing module, and the center channel processing module, the left channel processing module, the right channel processing module, the surround left channel processing module, and the surround right channel processing module are respectively configured for processing the first left channel signal and the first right channel signal into the center channel signal, the second left channel signal, the second right channel signal, the surround left channel signal, and the surround right channel signal;

wherein the surround left channel processing module comprises a signal adder, a signal LPF, a D/A converter, and a signal amplifier, the signal adder, the signal LPF, the D/A converter, and the signal amplifier being respectively configured for adding, filtering, converting, and amplifying the first left channel signal and the first right channel signal.

* * * * *